United States Patent [19]

Ishimura et al.

[11] Patent Number: 5,258,974
[45] Date of Patent: Nov. 2, 1993

[54] OPTICAL READ-OUT AUDIO CHECK DISC WITH SEMITRANSPARENT DEFECTS OR WITH SINGLE RECORDED TONE

[75] Inventors: Noriyuki Ishimura; Katsuji Yokoyama, both of Kanagawa, Japan

[73] Assignee: Sony Corporation, Tokyo, Japan

[21] Appl. No.: 527,383

[22] Filed: May 23, 1990

[30] Foreign Application Priority Data

Jun. 5, 1989 [JP] Japan .................................. 1-142321
Jun. 5, 1989 [JP] Japan .................................. 1-142322

[51] Int. Cl.⁵ .............................................. G11B 7/00
[52] U.S. Cl. .............................. 369/275.1; 369/275.3; 430/945; 356/243
[58] Field of Search ............... 369/275.1, 275.2, 275.3, 369/280, 283, 54, 58, 275.4; 430/945; 356/243

[56] References Cited

FOREIGN PATENT DOCUMENTS

| | | | |
|---|---|---|---|
| 0166614 | 1/1986 | European Pat. Off. | |
| 62-295233 | 12/1987 | Japan | 369/275.1 |
| 62-295234 | 12/1987 | Japan | 369/275.1 |
| 85/01381 | 3/1985 | PCT Int'l Appl. | |

OTHER PUBLICATIONS

Patent Abstracts of Japan, vol. 12, No. 188 (P-711) [3035], Jun. 2, 1988, & JP62-295234.
Patent Abstracts of Japan, vol. 9, No. 177 (P-375) [1900], Jul. 23, 1985 & JP60-50641.
IBM Technical Disclosure Bulletin, vol. 28, No. 4, Sep. 1985.
EBU Review, No. 227, Feb. 1988, pp. 2-6.
Funkschau, vol. 60, No. 23, Nov. 4, 1988, pp. 39-40.

*Primary Examiner*—W. H. Young
*Assistant Examiner*—P. W. Huber
*Attorney, Agent, or Firm*—Lewis H. Eslinger; Jay H. Maioli

[57] ABSTRACT

A check disc on which a single frequency signal is recorded on a check point next to an information signal of each track number and simulated defects such that the reproduction signal obtained by reproducing the disc becomes a defect signal in the case where defects occur on the disc are provided on the check point.

3 Claims, 4 Drawing Sheets

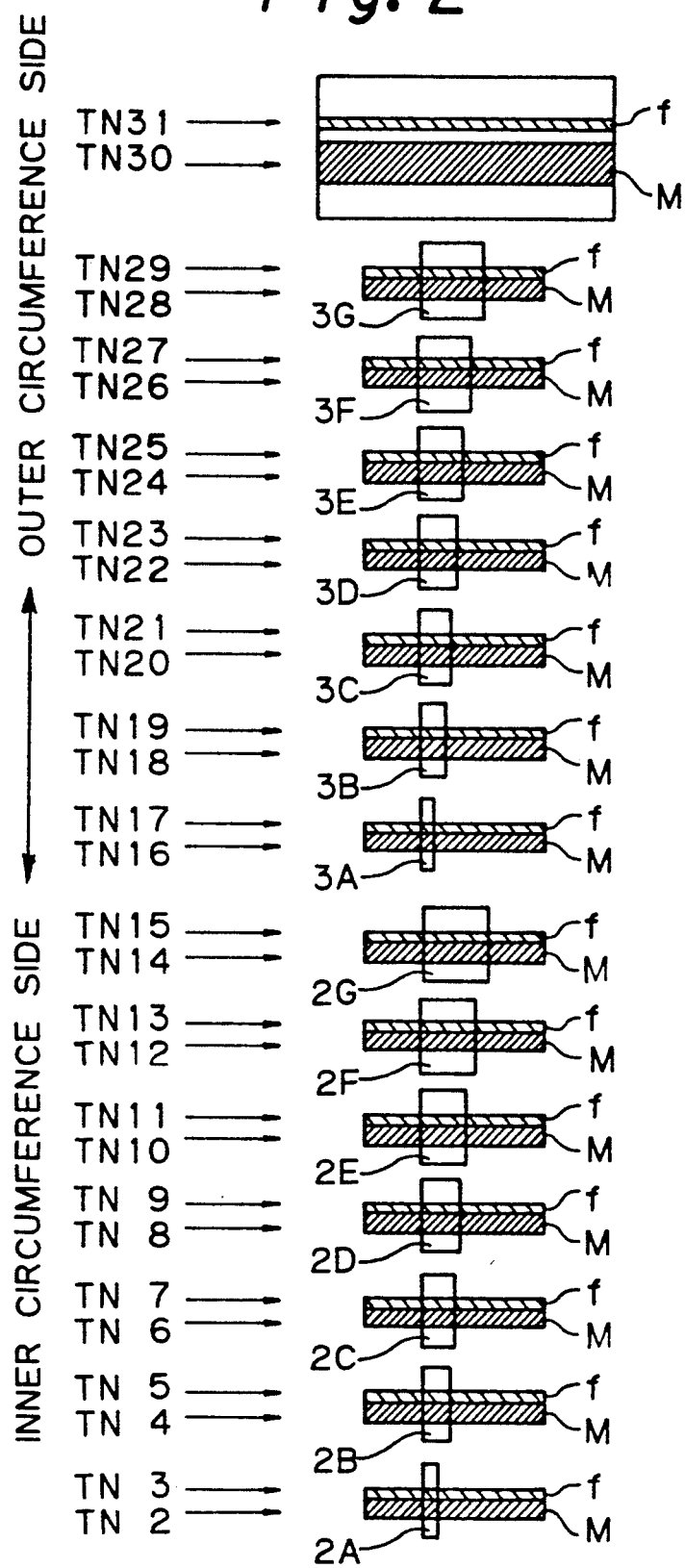

Fig. 3

| TRACK NUMBER | BLACK BAND | TRACK NUMBER | SEMITRANSPARENT BAND | TRACK NUMBER | FINGERPRINT |
|---|---|---|---|---|---|
| T N 2  | 0.3 mm Music  | T N 16 | 0.3 mm Music  | T N 30 | Music  |
| T N 3  | 0.3 mm 400Hz  | T N 17 | 0.3 mm 400Hz  | T N 31 | 400Hz |
| T N 4  | 0.4 mm Music  | T N 18 | 0.4 mm Music  |        |       |
| T N 5  | 0.4 mm 400Hz  | T N 19 | 0.4 mm 400Hz  |        |       |
| T N 6  | 0.5 mm Music  | T N 20 | 0.5 mm Music  |        |       |
| T N 7  | 0.5 mm 400Hz  | T N 21 | 0.5 mm 400Hz  |        |       |
| T N 8  | 0.6 mm Music  | T N 22 | 0.6 mm Music  |        |       |
| T N 9  | 0.6 mm 400Hz  | T N 23 | 0.6 mm 400Hz  |        |       |
| T N 10 | 0.7 mm Music  | T N 24 | 0.7 mm Music  |        |       |
| T N 11 | 0.7 mm 400Hz  | T N 25 | 0.7 mm 400Hz  |        |       |
| T N 12 | 0.9 mm Music  | T N 26 | 0.9 mm Music  |        |       |
| T N 13 | 0.9 mm 400Hz  | T N 27 | 0.9 mm 400Hz  |        |       |
| T N 14 | 1.1 mm Music  | T N 28 | 1.1 mm Music  |        |       |
| T N 15 | 1.1 mm 400Hz  | T N 29 | 1.1 mm 400Hz  |        |       |

OPTICAL READ-OUT AUDIO CHECK DISC WITH SEMITRANSPARENT DEFECTS OR WITH SINGLE RECORDED TONE

BACKGROUND OF THE INVENTION

1. Field of the Invention

The invention relates to a check disc for confirming playability of a compact disc player, etc.

2. Description of the Prior Art

There is a possibility that various physical defects will occur on a disc such as foreign materials present at the time of disc substrate molding, fingerprints attached during the subsequent manufacturing processes of the disc, etc. and scars occur on the information read-out surface of the compact disc. When such defects occur on the information read-out surface of the disc, a check disc is employed to simulate what the operation state of a disc player is.

Specifically, in a conventional check disc, a usual music signal is recorded, and on its information read-out surface, there are provided simulated defects such as black dots simulating the presence of foreign materials at the time of disc substrate molding, fingerprints consisting of fine dots simulating the presence of fingerprints attached to the information read-out surface of the disc and interruptions made to emit light at random simulating the presence assumption of scars on the information read-out surface of the disc.

With loading of the conventional check disc into a disc player, the simulation of the operation state of the disc player can be carried out for these defects such as foreign materials at the time of disc substrate molding, fingerprints attached onto the information read-out surface of the disc, and scars on the information read-out surface of the disc.

As has been described above, in the conventional check disc, various simulated defects are provided on the information read-out surface of the disc which has recorded a usual music signal. As a result, when the check of the playback state due to defects is done, the state of noises occurring due to the defects is heard differently by the state of reproduced music. In the state where the noise generation state is heard differently by the state of recorded music, correct check can not be made.

Further, in the conventional check disc, there are portions where two kinds of simulated defects of different sizes are in a piece of one track number. Consequently, it is impossible to simulate a playback state when a defect of a predetermined size occurs. As a result, it is desirable to provide one kind of simulated defect present in one piece of one track number. Clearly, if one kind of simulated defect lying in one piece of one track number is provided, the simulation of the playback state can be done immediately only by designating the piece of the track number where the defect of the predetermined size takes place.

Also, the occurrence of other kinds of defects which can not be simulated in the conventional check disc has recently become a problem.

Such defects as fine abrasions on the information read-out surface of the disc that occur when the disc is roughly handled repeatedly and stains that occurred by repeatedly spraying antistatic spray, for example, on the information read-out surface of the disc. Especially in a rental disc such defects are easy to occur, because it is used frequently and its handling is usually rough.

OBJECTS AND SUMMARY OF THE INVENTION

A main object of the invention is, therefore, to provide a check disc which is capable of correctly checking a change of a reproduction state occurring due to a defect.

Another object of the invention is to provide a check disc which is capable of immediately simulating the reproduction state in case of a occurrence of a defect of predetermined size.

Still another object of the invention is to provide a check disc which is capable of simulating even defects due to fine abrasions on the information read-out surface of the disc and defects due to stains of the whole disc.

According to an aspect of the invention, there is provided a check disc on which a predetermined single frequency signal is recorded on a check point next to an information signal of each track number.

According to another aspect of the invention, there is provided a check disc in which semitransparent coatings are provided at plural portions in a predetermined position on the information read-out surface of the disc substrate.

For correct check of a change in a reproduction state occurring due to a defect state, it is necessary to change only the defect state under other conditions made equal.

In the check disc 1, a music signal is recorded on each of track numbers TN2, TN4, TN6, . . . , TN30, and a single frequency signal of a frequency of 400 Hz, for example, is recorded on subsequent track numbers TN3, TN5, TN7, . . . , TN31. By checking a recording portion of the single frequency signal of the 400 Hz frequency through the playback, other conditions become the same. As a result, a change of the playback state occurring due to defects can be checked correctly.

Also, there are provided semitransparent bands 3A to 3G which can obtain a characteristic very similar to the case where abrasions occur on the disc. By these semitransparent bands 3A to 3G, the simulation of the playback state of the disc player can be done in the case where defects due to fine abrasions on the information read-out surface of the disc or defects due to stains of the whole disc occur.

The above, and other, objects, features and advantages of the present invention will become readily apparent from the following detailed description thereof which is to be read in connection with the accompanying drawings.

BRIEF DESCRIPTION OF THE DRAWINGS

FIGS. 2 and 3 are schematic diagrams for describing one embodiment of the invention;

DETAILED DESCRIPTION OF THE PREFERRED EMBODIMENTS

Figure 1:
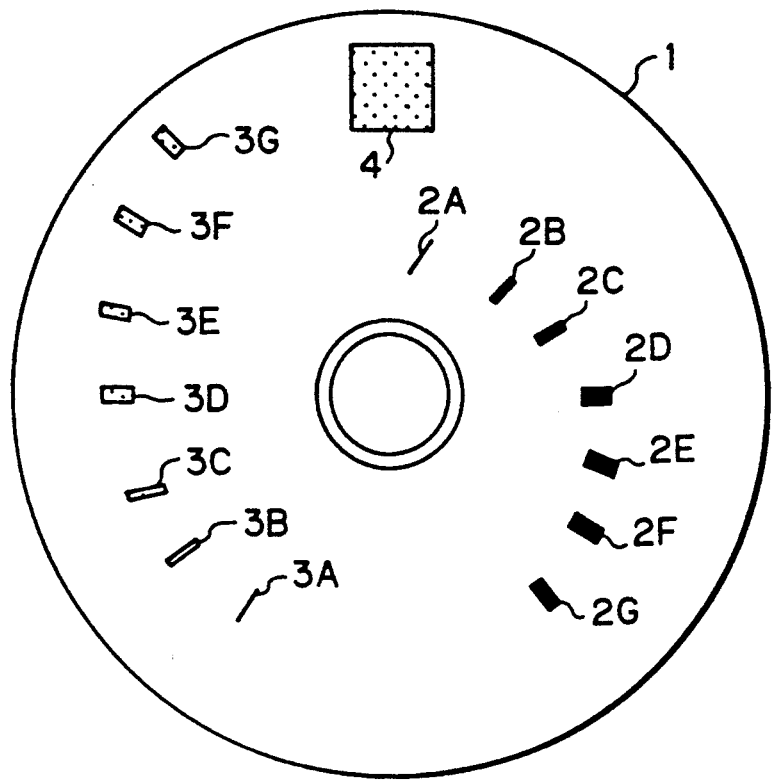
FIG. 1 is a plan view of this invention.

Hereunder, one embodiment of the invention will be described referring to the drawings.

FIG. 1 shows an information read-out surface of a check disc to which the invention has been applied. As indicated in FIG. 1, the check disc 1 has a shape similar to a compact disc with an outer diameter of 12 cm or 8 cm, for example, and a signal for check is recorded on the check disc 1 as a pit column similar to the compact disc. Various simulated defects are formed on the information read-out surface of the check disc 1 on the assumption of possible physical defects being present.

Clearly, FIGS. 2 and 3 show signals recorded in respective track numbers of the check disc 1 and simulated defects provided at positions of the respective track numbers. In the check disc 1 as shown in FIGS. 2 and 3, a music signal M is recorded on each of track numbers TN2, TN4, TN6, ..., TN30, and a single frequency signal f of a frequency of 400 Hz, for example, is recorded on subsequent track numbers TN3, TN5, TN7, ..., TN31.

Black bands 2A to 2G with different widths from one another are provided at positions corresponding to the track numbers TN2 to TN15 on the information read-out surface of the check disc 1, semitransparent bands 3A to 3G with different widths from one another are provided at positions corresponding to the track numbers TN16 to TN29, and a fingerprint 4 is provided at positions corresponding to the track numbers TN30, TN31.

The black bands 2A to 2G are simulated defects consisting of black coating, and the black bands 2A to 2G are provided on the assumption of defects of foreign materials being present at the time of disc substrate molding. As shown in FIG. 3, the widths of the black bands 2A to 2G are made so that the black band 2A lying on the innermost track numbers TN2 and TN3 has a width of 0.3 mm, the next black band 2B has a width of 0.4 mm, the black bands 2C to 2F have widths of 0.5 mm, 0.6 mm, 0.7 mm, 0.8 mm, 0.9 mm, 1.1 mm which are sequentially widened toward the outer circumference, and the black band 2G lying on the track numbers TN14 and TN15 has a width of 1.1 mm.

The semitransparent bands 3A to 3G are simulated defects consisting of semitransparent coating such as red color, for example, and the semitransparent bands 3A to 3G are made on the assumption of defects due to fine abrasions on the information read-out surface of the disc and defects due to stains of the whole disc being present. As shown in FIG. 3, the widths of the semitransparent bands 3A to 3G are made so that the semitransparent band 3A lying in the track numbers TN16 and TN17 has a width of 0.3 mm, the next semitransparent band 3B has a width of 0.4 mm, the semitransparent bands 3C to 3F have widths of 0.5 mm, 0.6 mm, 0.7 mm, 0.8 mm, 0.9 mm, 1.1 mm, which are sequentially widened toward the outer circumference and the semitransparent band 3G lying on the track numbers TN28 and TN 29 has a width of 1.1 mm.

The fingerprint 4 is a simulated defect on the assumption of a fingerprint attached onto the information read-out surface of the disc being present.

Figure 4:
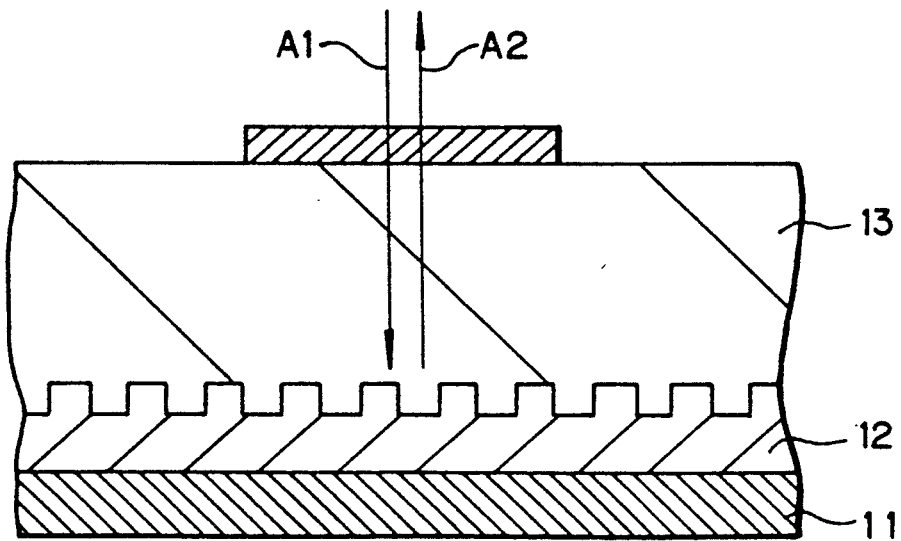
FIG. 4 is a sectional view of one embodiment of the invention.

As shown in FIG. 4, the semitransparent bands 3A to 3G are formed by printing on the information read-out surface of the disc in semitransparent ink composed of soft and hard vinyl chloride or polycarbonate, for example, which have been caused the variation of quality such as errosion, discoloration, deformation, and contain retarding medium of drying, etc. Here, FIG. 4 shows a section of the check disc 1, and in FIG. 4, 11 is a protective film, 12 is an aluminum reflection film, 13 is a disc substrate formed by polycarbonate, etc. The transmissivity of the semitransparent ink for forming the semitransparent bands 3A to 3G is set in a range of 30% to 60% with the center of 45% with a reflected beam A2 provided by the reflection of a laser beam A1 through the aluminum reflection film 12.

Figure 5A:
FIGS. 5A and 5B are waveform diagrams for describing one embodiment of the invention.
Figure 5B:

With the formation of the semitransparent bands 3A to 3G in the semitransparent ink with such transmissivity, this case comes to be similar to the state where abrasions occur in the information readout surface of the disc. More specifically, FIG. 5A shows a playback RF signal when a semitransparent band having a width of 0.6 mm is formed on a disc in the ink with such transmissivity, while FIG. 5B indicates a playback RF signal when abrasions actually occur on the information read-out surface of the disc. As can be understood from the comparison between FIG. 5A and FIG. 5B, the formation of such semitransparent bands onto the information read-out surface of the disc can provide a characteristic similar to the case where abrasions actually occur on the information read-out surface of the disc.

Here, the semitransparent bands 3A to 3G may be formed by melting, evaporation or bonding.

As mentioned above, the semitransparent bands 3A to 3G are provided on the check disc 1 to provide the characteristic similar to the case where abrasions occur on the information read-out surface of the disc. For this reason, simulation can be performed with respect to defects due to fine abrasions occurred on the information read-out surface or due to stains of the whole disc.

The music signal M is recorded on each of the track numbers TN2, TN4, TN6, ..., TN30 of the check disc 1. The single frequency signal f of the frequency of 400 Hz, for example, is recorded on the subsequent track numbers TN3, TN5, TN7, ..., TN31. As a result, the state of noises occurring due to the defects can be confirmed easily. Also, since a similar single frequency signal is recorded on the black bands 2A to 2G and the semitransparent bands 3A to 3G, which are different from one another, the state of the noises can be compared easily.

Further, since one kind of simulated defect is provided in one track number, the simulation of the operation state of a disc player can be performed immediately when such kinds of defects present in the positions of the corresponding track numbers occur by reproducing with the designation of track numbers.

Here, the invention is not limited to a check disc for a compact disc for music and is similarly applicable to a check disc for a disc driver as a playback apparatus of a CD-ROM on which digital data is recorded, for example.

According to the invention, a music signal is recorded onto each of the track numbers TN2, TN4, TN6, ..., TN30, and a single frequency signal of a frequency of 400 Hz, for instance, is recorded onto the subsequent track numbers TN3, TN5, TN7, ..., TN31. For this reason, by checking through the playback of a recording portion of the single frequency signal of the 400 Hz frequency, other conditions become the same to enable the correct check of a change of a playback state due to defects.

Also, according to the invention, because one kind of simulated defect is formed in one track number, the simulation of the operation state of the disc player can be done immediately when such kinds of defects lying in the positions of the corresponding track numbers occur by reproducing with the designation of track numbers.

Further, according to the invention, there are provided the semitransparent bands 3A to 3G which can obtain a characteristic very similar to the case where abrasions occur on the disc. For this reason, the simulation of the playback state of the disc player can be done in the case where defects due to fine abrasions on the read-out surface of the disc or defects due to stains of the whole disc occur.

What is claimed is:

1. A check disc in which a plurality of semitransparent coating portions having a light transmissibility in a range of 30% to 60% are provided at respective predetermined positions on an information read-out surface of a substrate of the check disc, wherein said semitransparent coating portions have respectively different sizes and are respectively arranged in a shape of a circular arc and are formed so that their respective sizes gradually increase from the inner circumference of the disc to the outer circumference of the disc.

2. A check disc according to claim 1, wherein said semitransparent coating portions are provided by printing in a semitransparent ink on the information read-out surface of the disc substrate.

3. A check disc according to claim 1, wherein a predetermined single frequency signal is recorded on said disc next to each track containing an information signal at the positions at which said semitransparent coating portions are provided.

* * * * *